United States Patent [19]
Matthews

[11] Patent Number: 5,988,226
[45] Date of Patent: Nov. 23, 1999

[54] HIGH PRESSURE SAFETY HOSE ASSEMBLY AND METHOD OF MANUFACTURING

[75] Inventor: Andy Matthews, Evanston, Ill.

[73] Assignee: Senior Engineering Investments AG, Switzerland

[21] Appl. No.: 08/644,990

[22] Filed: May 9, 1996

[51] Int. Cl.[6] ................................................. F16L 11/12
[52] U.S. Cl. .................... 138/109; 138/110; 138/127; 138/134; 138/DIG. 3; 285/254; 285/222.5
[58] Field of Search ............................ 138/110, 109, 138/127, 134, DIG. 3; 285/256, 258, 254, 255, 259, 222.2, 222.4, 222.5

[56] References Cited

U.S. PATENT DOCUMENTS

| | | | |
|---|---|---|---|
| 1,651,022 | 11/1927 | Fulton | 138/127 |
| 1,684,554 | 9/1928 | Riefenstahl | 138/134 |
| 2,121,624 | 6/1938 | Cowles | 285/84 |
| 2,166,448 | 7/1939 | Schuknecht et al. | 138/110 |
| 2,305,644 | 12/1942 | Stone | 138/127 |
| 2,540,203 | 2/1951 | Hatcher, Sr. | 138/134 |
| 2,807,502 | 9/1957 | Tharp | 285/254 |
| 3,831,635 | 8/1974 | Burton | 138/110 |
| 4,367,889 | 1/1983 | Redl | 138/127 |
| 5,199,752 | 4/1993 | Sanders et al. | 138/121 |
| 5,413,147 | 5/1995 | Moreiras et al. | 138/109 |
| 5,430,603 | 7/1995 | Albino et al. | 138/DIG. 3 |

OTHER PUBLICATIONS

Western Enterprises Catalog, Jan. 1991, pp. 1, 2, and 43 showing "Western® Pigtail".
Applicant's Demonstrative Drawing, showing detailed assembly of "Western® Pigtail".
Jackson Industries Brochure Jan. 1995, pp. 1 and 2 showing "Whipcheck".
Jackson Industries Demonstrative Drawing, Mar. 13, 1995, showing detailed assembly of "Whipcheck" apparatus.

Primary Examiner—James F. Hook
Attorney, Agent, or Firm—Dick & Harris

[57] ABSTRACT

A flexible, high pressure gas safety hose assembly is provided. The safety hose assembly has a tube with a first end and a second end, and a metal braid covering the tube. The hose assembly also has an inner fitting connected about the tube at the first end and at the second end, respectively, as well as a spiral spring guard wrapped around the braid covering the tube. An connection fitting having an integral inner flange is provided at the first end and at the second end of the tube. A collar is crimped over the spring guard to secure the spring guard to the integral inner flange of the connection fitting at the first end and at the second end of the tube. A method of manufacturing a safety hose assembly without welding is also provided. The method has the steps of: providing a tube having a first end and a second end; wrapping the tube in a protective braid; connecting an inner collar at the first end and at the second end of the tube; wrapping a spiral spring guard around the tube; providing a connection fitting having an inner flange; press-fitting the tube and spiral spring guard onto the connection fitting such that the spring guard encircles the inner flange; and crimping an outer collar over the spring guard and the inner flange to capture the spring guard onto the connection fitting.

22 Claims, 1 Drawing Sheet

HIGH PRESSURE SAFETY HOSE ASSEMBLY AND METHOD OF MANUFACTURING

BACKGROUND OF THE INVENTION

1. Field of the Invention

The present invention relates generally to hoses and more specifically to a flexible, high pressure safety hose assembly and a method of manufacturing same.

2. Description of the Related Art

In many factories, workshops and other industrial locations, tanks of compressed gas under high pressures and other materials stored in tanks are commonly used. For example, certain welding and cutting applications require the use of these tanks. The high pressure gases in these tanks present several potential dangers and hazards for the operator. For example, problems are common in the transportation, storage and handling of the tanks having contents under high pressure. Another very common hazardous situation involves the filling of the cylinders. Quite often the cylinder tanks are loaded through a standard pigtail hose. However, these standard pigtails often experience wear, including kinking, twisting, abrasion and crushing. These wear factors account for 95% of the failures of pigtails.

In the event of a burst pigtail hose, the pigtail will most likely separate at the fittings. The high pressure gas continues traveling through the pigtail which causes the pigtail to whip around uncontrollably. Such an occurrence presents a dangerous situation wherein extreme harm to an operator could result.

In addition, the cylinder tanks can easily be knocked over. When the tanks are knocked over, the pigtail hose usually breaks causing the problems mentioned above. Also, the fact that the cylinder tank is rolling around in the ground is a very dangerous situation for an operator. Workers could be easily injured by the heavy, loose tanks.

As a result, a need has arisen for a flexible high pressure safety hose assembly that is capable of containing a burst hose and providing increased strength and rupture protection features. In addition, hoses are commonly manufactured wherein the connections of the hose components are crimped or swaged. As a result, a method of manufacturing a flexible high pressure safety hose assembly is also needed which reduces costs and failures.

SUMMARY OF THE INVENTION

To this end, the present invention provides a flexible, high pressure safety hose assembly for use with high pressure cylinder tanks. The hose assembly includes, in an embodiment, a TEFLON® tube having a first end and a second end and a stainless steel braid encircling the tube. In addition, a stainless steel closely wound spiral spring guard is wrapped around the tube and the braid and includes an inner collar connected at the first end and at the second end of the hose. A connection fitting, preferably having threaded ends and a through hole is provided at each end of the tube. Outer collars are crimped over the spiral spring guard at a distance in from the ends about the inner collar to provide an unbreakable connection by capturing the spiral spring guard to the connection fittings. As a result, if the hose bursts, the connection fittings remain attached to the tank and the filling station valve. Also, the hose is contained within the spiral closely wound spring guard.

The present invention also provides a method of manufacturing a high pressure safety hose without welding. The method has the steps of: providing a tube having a first end and a second end; wrapping the tube in a protective braid; crimping an inner collar at the first end and at the second end of the tube over the braid; wrapping a spiral spring guard around the tube and braid; providing a connection fitting having an integral inner flange; press fitting the inner collar and tube as well as the spiral spring guard onto the connection fitting such that the spring guard encircles the inner flange; and crimping a collar over the spring guard and the internal flange to capture the spring guard onto the integral inner flange of the connection fitting.

The present invention provides a flexible high pressure safety hose assembly having the advantage of a stainless steel spiral spring guard to provide unequalled kink resistance, especially at the fittings where most failures are prone to occur. Another advantage of the present invention is that if a cylinder falls during filling, thereby causing the hose to break, the spiral spring guard will extend to maintain full coverage along the length of the hose. This spring guard prevents the hose from whipping as described above.

DETAILED DESCRIPTION OF THE PREFERRED EMBODIMENTS

Figure 1:
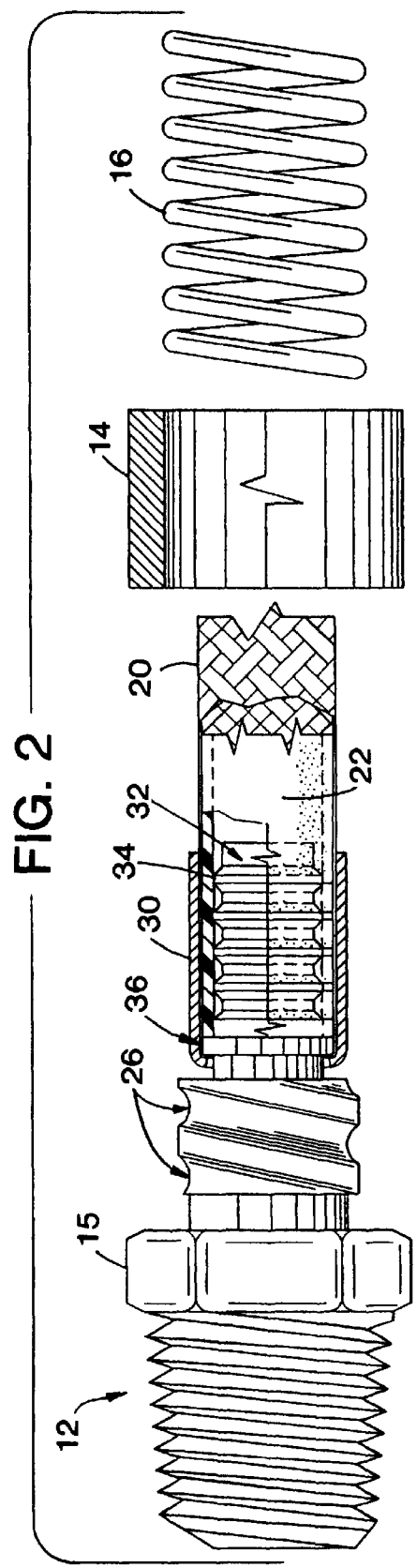
FIG. 1 illustrates an embodiment of a flexible, high pressure gas safety hose assembly of the present invention including a cut away detail view of an end thereof

FIG. 1 illustrates an embodiment of a flexible, high pressure safety hose assembly shown generally at 10. The hose assembly 10 has a connection fitting 12 located at each end to attach the hose assembly 10 to a CGA fitting which connects to a tank or filling station (not shown). Each fitting 12 also has an outer collar 14. The connection fitting 12 is preferably a 304 stainless steel or brass insert having NPT or JIC threads and a through hole 13. The connection fitting 12 also has a nut 15 to aid in tightening the safety hose assembly 10 to a tank. The outer collar 14 is also preferably stainless steel. A closely wound spiral spring guard 16 is wrapped around a hose 18 to protect the assembly 10 in the event the hose 18 might burst. The spiral spring guard 16 is also preferably stainless steel. The specially selected stainless steel spiral spring guard 16 provides excellent kink resistance, particularly at the fittings where most failures are prone to occur. The spiral spring guard 16 also has a coil pitch which is the number of coils per unit of length. The hose 18 preferably includes a stainless steel braid 20.

Referring to the cut away detail of FIG. 1, the hose 18 comprises a tube 22 wrapped by the braid 20. As illustrated, the spiral spring guard 16 also wraps around an inner flange 24 of the connection fitting 12. The inner flange 24 has a semicircular groove 26 formed therein for holding the spiral spring guard 16. The groove 26 preferably has a pitch equal to the coil pitch of the spring guard 16. The inner flange 24 is also part of the connection fitting 12. The outer collar 14 is crimped over the spring guard 16 such that the spring guard 16 fits within the groove 26 to hold the spring guard 16 to the inner flange 24 of the connection fitting 12. Since the coil pitch of the spring guard 16 matches the pitch of the groove 26, the spring guard 16 is held securely by crimping the outer collar 14 thereon as discussed below. With this arrangement as discussed further below, in the event of a rupture of the hose 18 or a separation of the hose 18 from the connection fitting 12, the hose 18 will be contained within the spring guard 16. The connection fittings 12 will remain connected to the spiral spring guard 16 by being clamped by the crimped outer collar 14. Thus, the spring guard 16 does not disconnect from the connection fittings 12 and the hose 18 is contained within the spring guard 16. As a result, the present invention solves the prior art problem of a whipping, uncontrollable tube resulting from the tube separating from the fitting.

In a preferred embodiment, the tube 22 may be manufactured of ¼" inner diameter extruded TEFLON® material with a 304 stainless steel over braid 20. Other materials having appropriate characteristics can of course also be used. A working pressure of the hose assembly 10 of the present invention in an embodiment is 3500 PSIG. In addition, a burst pressure of at least 14,000 PSIG is provided. The hose assembly 10 is capable of withstanding a temperature range of −65° to 450° Fahrenheit. An additional embodiment of the hose assembly 10 is individually tested to have a 6000 PSIG working pressure and a minimum burst pressure of 24,000 PSIG.

Also, each hose assembly 10 is manufactured according to CGA E9 specifications. Each hose assembly 10 has a tag 28 indicating the date of manufacture, working pressure and location of the manufacture for any failure reporting or other appropriate data. The tag 28 may be PTFE or heat shrink.

Figure 2:
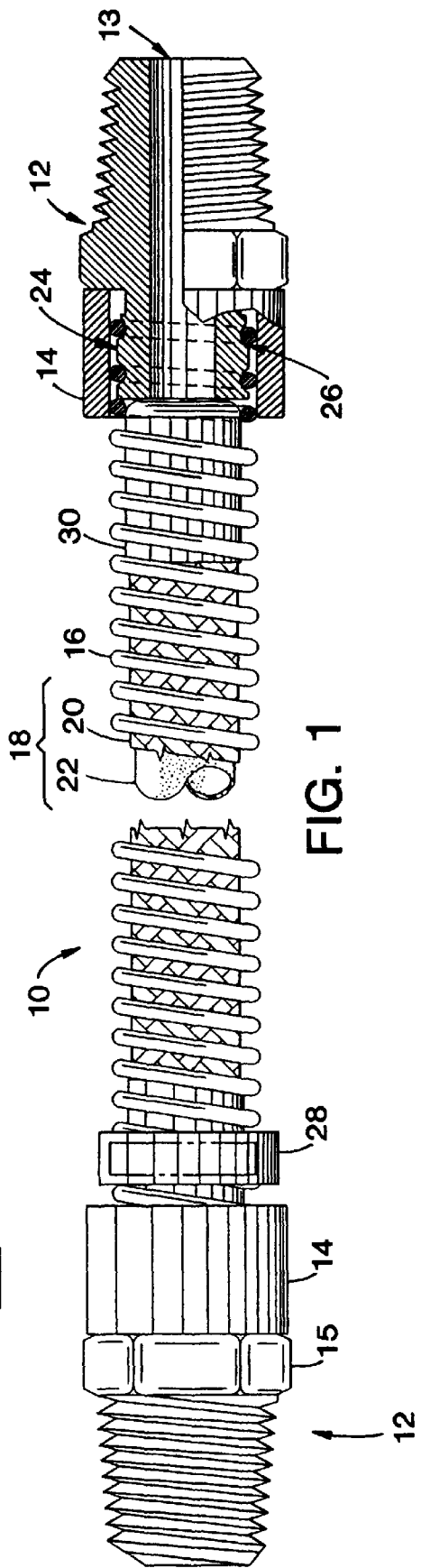
FIG. 2 illustrates an enlarged detail view of an end of the hose assembly of the present invention in partial cut-away.

As stated above, the present invention also provides a method of manufacturing a high pressure safety pigtail hose assembly. The method will now be described with reference to FIG. 2. Initially, the TEFLON® tube 22 is wrapped with the stainless steel over braid 20. An inner collar 30 is connected, preferably by crimping, at the ends of the stainless steel braided tube 22. The inner collar 30 is crimped over the braid 20 and the tube 22 onto a stem 32 of the connection fitting 12. The stem 32 has ribs 34 for maintaining the tube 22 onto the stem 32 which is integral to the connection fitting 12. The inner collar 30 is also crimped over a circumferential lip 36 so that a part of the crimping further maintains the inner collar 30 and hose 18 on the connection fitting 12 by folding over the lip 36. The spiral spring guard 16 is wrapped about the hose 18 so that it encircles the hose 18 and the inner collars 30. The hose 18 and spring guard 16 are inserted into the connection fitting 12. The spring guard 16 fits over the inner flange 24 of the connection fitting 12 such that the spiral spring guard 16 fits within the semicircular groove 26 since the pitch of each matches. This provides a seated resting point for the spring guard 16. The outer collar 14 is then crimped over the spring guard and the inner flange 24 to hold the spring guard 16 in the semicircular groove 26. The spring guard 16 is thereby held tightly by the crimped outer collar 14 to the inner flange 24 near the end of the inner flange 24. This assembly advantageously and strongly holds the tube 18 to the connection fitting 12 so that the hose 18 remains captured within the spring guard 16 even if the hose 18 becomes separated from the fitting 12.

As is apparent from the foregoing specification, the invention is susceptible of being embodied with various alterations and modifications which may differ particularly from those that have been described in the preceding specification and description. It should be understood that I wish to embody within the scope of the patent warranted hereon, all such modifications as reasonably and properly come within the scope of my contribution to the art.

I claim:

1. A flexible safety hose assembly for conducting the free flow of high pressure fluids between at least a pair of articles, comprising:

at least one article connection fitting, having a connection member configured for enabling releasable affixation of the article connection fitting to a first of said articles, the at least one article connection fitting further including a hose attachment member;

a hose configured for the transmission of fluids therethrough, and operably affixed at a first end thereof to the hose attachment member, the hose including an inner fluid-tight tubular member and an outer, metallic reinforcing member substantially coextensive with the inner fluid-tight tubular member;

means affixing the hose to the hose attachment member;

an elongated hose guard member, circumferentially surrounding a substantial portion of the length of the hose, and extending axially beyond at least one end of the hose, to, in turn, circumferentially surround at least a portion of the hose attachment member, the elongated hose guard member further being operably affixed at an end thereof to the at least one article connection fitting, for substantially constraining movement of the one end of the hose, relative to the at least one article connection fitting, in the event of separation of the one end of the hose from the at least one article connection fitting; and means for affixing the hose guard member directly to the at least one article connection fitting, including at least one grooved collar, operably affixed to said at least one article connection fitting, said means for affixing the hose guard member directly to the at least one article connection fitting, further including a crimping collar member operably surrounding and compressively engaging at least a portion of the one end of the guard member positioned within said grooved collar.

2. The flexible safety hose assembly according to claim 1, wherein the hose attachment member comprises:

a substantially cylindrical portion of the at least one article connection fitting, insertingly received within the one end of the hose, within an end of the inner, fluid-tight tubular member, the substantially cylindrical portion having an end having one or more radially extending ridges, grippingly engaging an inner surface of the one end of the hose.

3. The flexible safety hose assembly according to claim 2, wherein the means affixing the hose to the hose attachment member comprises:

an annular flange emanating radially from the substantially cylindrical portion of the at least one article connection fitting, at a position substantially adjacent an axially innermost one of the one or more radially extending ridges; and a hose collar, substantially encircling and compressively engaging at least a portion of the one end of the hose grippingly engaged by the hose attachment member.

4. The flexible safety hose assembly according to claim 3, wherein the outer, metallic reinforcing member comprises:

a braided metal tube substantially surrounding the inner, fluid-tight tubular member, and having at least one end which is substantially encircled and compressively engaged by the hose collar.

5. The flexible safety hose assembly according to claim 1, wherein the at least one grooved collar further includes at least one gripping surface operably configured to grippingly engage the one distal end of the hose guard member.

6. The flexible safety hose assembly according to claim 5, wherein the guard member is a helical spring member, and the at least one gripping surface comprises a helical groove, having a pitch corresponding to that of the helical spring member, disposed in at least a portion of the substantially cylindrical portion of the at least one article connection fitting.

7. The flexible safety hose assembly according to claim 1, wherein the outer, metallic reinforcing member comprises:

a braided metal tube substantially surrounding the inner, fluid-tight tubular member.

8. The flexible safety hose assembly according to claim 1, wherein the at least one article connection fitting is provided with a threaded end, operably configured for enabling attachment of the flexible safety hose assembly to an article.

9. The flexible safety hose assembly according to claim 1, wherein the inner, fluid-tight tubular member is constructed of an elastomeric material.

10. The flexible safety hose assembly according to claim 9, wherein the inner, fluid-tight tubular member is constructed of polytetrafluoroethylene.

11. The flexible safety hose assembly according to claim 1, wherein the elongated hose guard member extends axially beyond a second end of the hose, the flexible safety hose assembly further comprising:

a second article connection fitting, having a connection member configured for enabling releasable affixation of the second article connection fitting to a second of said articles, the second article connection fitting further including a hose attachment member;

the hose being operably affixed at a second end thereof to the hose attachment member of the second article connection fitting;

means for affixing the hose to the hose attachment member of the second article connection fitting;

the hose guard member, completely surrounding the second end of the hose and at least a portion of the hose attachment member of the second article connection fitting, and operably affixed at the second end thereof to the second article connection fitting, for substantially constraining movement of the second end of the hose, relative to the second article connection fitting, in the event of separation of the second end of the hose from the second article connection fitting; and means for affixing the hose guard member directly to the second article connection fitting, including at least one grooved collar, operably affixed to said second article connection fitting, said means for affixing the hose guard member further including a crimping collar member operably surrounding and compressively engaging at least a portion of the one end of the guard member positioned within said grooved collar.

12. A method for manufacturing a flexible safety hose assembly for conducting the free flow of high pressure fluids between at least a pair of articles, comprising:

forming at least one article connection fitting, having a connection member configured for enabling releasable affixation of the article connection fitting to a first of said articles, forming on the at least one article connection fitting a hose attachment member;

forming a hose, having an inner, fluid-tight tubular member and an outer, metallic reinforcing member substantially coextensive with the inner, fluid-tight tubular member;

operably affixing the hose configured for the transmission of fluids therethrough, at a first end thereof to the hose attachment member;

completely surrounding a substantial portion of the length of the hose and at least a portion of the hose attachment member with an elongated hose guard member, the elongated hose guard member extending axially beyond at least one end of the hose, and operably affixing the hose guard member at one end thereof to the at least one article connection fitting, for substantially constraining movement of the one end of the hose, in the event of separation of the one end of the hose from the at least one article connection fitting, by affixing the hose guard member directly to the at least one article connection fitting, with at least one grooved collar, operably affixed to said at least one article connection fitting, operably surrounding and compressively engaging at least a portion of the one end of the guard member positioned within said grooved collar with a crimping collar member.

13. The method for manufacturing a flexible safety hose assembly according to claim 12, wherein the step of forming a hose attachment member comprises the step of:

forming a substantially cylindrical portion of the at least one article connection fitting, insertingly received within the one end of the hose, within an end of the inner, fluid-tight tubular member, forming one or more radially extending ridges on an end of the substantially cylindrical portion of the at least one article fitting for grippingly engaging an inner surface of the one end of the hose.

14. The method for manufacturing a flexible safety hose assembly according to claim 13, wherein the step of affixing the hose to the hose attachment member comprises the steps of:

forming an annular flange emanating radially from the substantially cylindrical portion of the at least one article connection fitting, at a position substantially adjacent an axially innermost one of the one or more radially extending ridges;

inserting the end of the hose onto the substantially cylindrical portion of the at least one article connection fitting, so that the end of the hose becomes grippingly engaged by the hose attachment member; and substantially encircling and compressively engaging at least a portion of the one end of the hose grippingly engaged by the hose attachment member, by a hose collar.

15. The method for manufacturing a flexible safety hose assembly according to claim 14, wherein the outer, metallic reinforcing member comprises a braided metal tube, the method further comprising the step of:
substantially encircling and compressively engaging one end of the braided metal tube by the hose collar.

16. The method for manufacturing a flexible safety hose assembly according to claim 12, wherein the step of affixing one end of the hose guard member further comprises the step of forming at least one gripping surface on the at least one grooved collar, to grippingly engage the one end of the hose guard member.

17. The method for manufacturing a flexible safety hose assembly according to claim 16, wherein the guard member is a helical spring member, wherein the step of forming at least one gripping surface further comprises the steps of:

forming the at least one gripping surface as helical groove, having a pitch corresponding to that of the helical spring member, disposed in at least a portion of the substantially cylindrical portion of the at least one article connection fitting.

18. The method for manufacturing a flexible safety hose assembly according to claim 17, wherein the outer, metallic reinforcing member comprises:

a braided metal tube.

19. The method for manufacturing a flexible safety hose assembly according to claim 12, further comprising the step of:

providing the at least one article connection fitting with a threaded end, operably configured for enabling attachment of the flexible safety hose assembly to an article.

20. The method for manufacturing a flexible safety hose assembly according to claim 12, further comprising the step of:

constructing the inner, fluid-tight tubular member of an elastomeric material.

21. The method for manufacturing a flexible safety hose assembly according to claim 20, wherein further comprising the step of:

constructing the inner, fluid-tight tubular member of polytetrafluoroethylene.

22. The method for manufacturing a flexible safety hose assembly according to claim 12, the elongated hose guard member extending axially beyond a second end of the hose, the method further comprising the steps of:

forming a second article connection fitting, having a connection member configured for enabling releasable affixation of the second article connection fitting to a second of said articles, forming a hose attachment member on the second article connection fitting;

operably affixing the hose at a second end thereof to the hose attachment member of the second article connection fitting;

completely surrounding the second end of the hose and the hose attachment member of the second article connection fitting, and operably affixing the hose guard member at the second end thereof to the second article connection fitting, for substantially constraining movement of the second end of the hose, relative to the second article connection fitting, in the event of separation of the second end of the hose from the second article connection fitting, by affixing the hose guard member directly to the second article connection fitting, with at least one grooved collar, operably affixed to said second article connection fitting, operably surrounding and compressively engaging at least a portion of the one end of the guard member positioned within said grooved collar with a crimping collar member.

* * * * *